US009836396B2

(12) United States Patent
Wang et al.

(10) Patent No.: US 9,836,396 B2
(45) Date of Patent: Dec. 5, 2017

(54) METHOD FOR MANAGING A LAST LEVEL CACHE AND APPARATUS UTILIZING THE SAME

(71) Applicants: MediaTek Inc., Hsin-Chu (TW); National Taiwan University, Taipei (TW)

(72) Inventors: Po-Han Wang, Taipei (TW); Cheng-Hsuan Li, Kaohsiung (TW); Chia-Lin Yang, Taipei (TW)

(73) Assignees: MEDIATEK INC., Hsin-Chu (TW); NATIONAL TAIWAN UNIVERSITY, Taipei (TW)

( * ) Notice: Subject to any disclaimer, the term of this patent is extended or adjusted under 35 U.S.C. 154(b) by 134 days.

(21) Appl. No.: 14/936,960

(22) Filed: Nov. 10, 2015

(65) Prior Publication Data

US 2016/0342514 A1  Nov. 24, 2016

Related U.S. Application Data

(60) Provisional application No. 62/164,715, filed on May 21, 2015.

(51) Int. Cl.
*G06F 12/0811*   (2016.01)
*G06F 3/06*   (2006.01)
(Continued)

(52) U.S. Cl.
CPC ........ *G06F 12/0811* (2013.01); *G06F 3/0604* (2013.01); *G06F 3/0631* (2013.01);
(Continued)

(58) Field of Classification Search
None
See application file for complete search history.

(56) References Cited

U.S. PATENT DOCUMENTS 7,284,095 B2 * 10/2007 Hu ...................... G06F 12/0811
711/133
2015/0127912 A1 * 5/2015 Solihin ................... G06F 12/08
711/125

OTHER PUBLICATIONS

Qureshi, M.K., et al.; "Utility-Based Cache Partitioning: A Low-Overhead, High-Performance, Runtime Mechanism to Partition Shared Caches;" In Proceedings of the 39th Annual IEEE/ACM International Symposium on Microarchitecture (MICRO 39); IEEE Computer Society; 2006; pp. 1-10.

(Continued)

*Primary Examiner* — Adam M Queler
*Assistant Examiner* — Edmund Kwong
(74) *Attorney, Agent, or Firm* — McClure, Qualey & Rodack, LLP

(57) ABSTRACT

A last-level cache controller includes a system state monitor and a cache partitioning module. The system state monitor is configured to obtain a latency sensitivity factor, off-chip latency factors, and cache miss information for each of the processor cores. The cache partitioning module is configured to: obtain a first weighted latency according to the latency sensitivity factor, the off-chip latency factors and a first entry of the cache miss information that corresponds to a first cache partition configuration for each of the processor cores; obtain a first aggregated weighted latency according to the first weighted latency of each of the processor cores; determine whether a partition criterion is satisfied, where the partition criterion takes the first aggregated weighted latency into consideration; and partition the cache ways of the last-level cache using the first partition configuration when determining that the partition criterion is satisfied.

20 Claims, 6 Drawing Sheets

(51) Int. Cl.
*G06F 12/084* (2016.01)
*G06F 12/0842* (2016.01)
*G06F 12/0895* (2016.01)
*G06F 12/0864* (2016.01)

(52) U.S. Cl.
CPC .......... *G06F 3/0653* (2013.01); *G06F 3/0673* (2013.01); *G06F 12/084* (2013.01); *G06F 12/0842* (2013.01); *G06F 12/0895* (2013.01); *G06F 12/0864* (2013.01); *G06F 2212/1024* (2013.01); *G06F 2212/601* (2013.01)

(56) References Cited

OTHER PUBLICATIONS

Lee, J., et al.; "TAP: A TLP-Aware Cache Management Policy for a CPU-GPU Heterogeneous Architecture," IEEE 18th International Symposium on High Performance Computer Architecture (HPCA); Feb. 2012; pp. 1, 12, 25-29.

* cited by examiner

| cache ways allocated | cache miss count |
|---|---|
| 4 | 5 |
| 3 | 6 |
| 2 | 8 |
| 1 | 10 |
| 0 | 20 |

FIG. 4A

| cache ways allocated | cache miss count |
|---|---|
| 4 | 8 |
| 3 | 13 |
| 2 | 15 |
| 1 | 17 |
| 0 | 20 |

FIG. 4B

METHOD FOR MANAGING A LAST LEVEL CACHE AND APPARATUS UTILIZING THE SAME

CROSS REFERENCE TO RELATED APPLICATIONS

This application claims the benefit of U.S. Provisional Application No. 62/164,715 filed May 21, 2015, the entirety of which is incorporated by reference herein.

BACKGROUND OF THE INVENTION

Field of the Invention

The invention relates generally to a last level cache controller and method for partitioning cache ways of a last level cache among processor cores.

Description of the Related Art

In multi-core computing system such as a heterogeneous computing system, shared last-level cache (LLC) management is critical to performance. Without proper management, massive memory accesses from one or more first cores (e.g., GPU cores) degrade the performance of one or more second cores (e.g., CPU cores). Cache partitioning is a commonly used technique for LLC management in such multi-core computing systems.

Several factors are important in performing LLC management. Firstly, latency-tolerant capability of GPUs needs to be taken into account. Secondly, cache resources are preferably allocated based on latency sensitivity (contribution of LLC access latency to the system performance) of each processor core. Thirdly, memory traffic incurred from less-sensitive cores may cause adverse effects on the overall performance because of prolonged off-chip access latency. As such, an efficient solution for LLC management that jointly considers the aforementioned factors is desired.

BRIEF SUMMARY OF THE INVENTION

A last level cache controller, and methods for last level cache management are provided. The last level cache controller is for partitioning cache ways of a last level cache among processor cores. An exemplary embodiment of the last level cache controller comprises a system state monitor and a cache partitioning module. The system state monitor is configured to obtain, for each of the processor cores, a latency sensitivity factor, off-chip latency factors and cache miss information, wherein the cache miss information comprises a plurality of entries and each entry shows a cache miss count under an allocated number of cache ways. The cache partitioning module is configured to do the following: obtain, for each of the processor cores, a first weighted latency according to the latency sensitivity factor, the off-chip latency factors, and a first entry of the cache miss information that corresponds to a first cache partition configuration; obtain a first aggregated weighted latency according to the first weighted latency of each of the processor cores; determine whether a partition criterion is satisfied, wherein the partition criterion takes the first aggregated weighted latency into consideration; partition the cache ways of the last level cache using the first partition configuration when determining that the partition criterion is satisfied.

An exemplary embodiment of the method for last level cache management partitions cache ways of a last level cache among processor cores is provided. The method comprises the following steps: obtain, for each of the processor cores, a latency sensitivity factor, off-chip latency factors and cache miss information, wherein the cache miss information comprises a plurality of entries and each entry shows a cache miss count under an allocated number of cache ways; obtain, for each of the processor cores, a first weighted latency according to the latency sensitivity factor, the off-chip latency factors, and a first entry of the cache miss information that corresponds to a first cache partition configuration; obtain a first aggregated weighted latency according to the first weighted latency of each of the processor cores; determine whether a partition criterion is satisfied, wherein the partition criterion takes the first aggregated weighted latency into consideration; and partition the cache ways of the last level cache using the first partition configuration when determining that the partition criterion is satisfied.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4A gives exemplary content of cache miss information according to some embodiments of the invention;

FIG. 4B gives exemplary content of cache miss information according to some embodiments of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiments of the invention generally relate to a computing system that includes processor cores. Some embodiments of the invention more specifically relate to a heterogeneous computing system. The term "heterogeneous computing system" refers to a computing system that includes processors having different hardware architecture, such as CPUs, GPUs and digital signal processors (DSPs). In the following description, embodiments of the invention are described with reference to an example of a heterogeneous computing system that may include one or more CPUs and one or more GPUs. It is understood, however, that the embodiments of the invention are applicable to any computing system or heterogeneous computing system, such as a system that includes any combination of CPUs, GPUs, DSPs and/or other types of processors or any computing system that includes, for example, a plurality of a same type of processor cores or big/little cores of a same type of processor cores.

Figure 1:
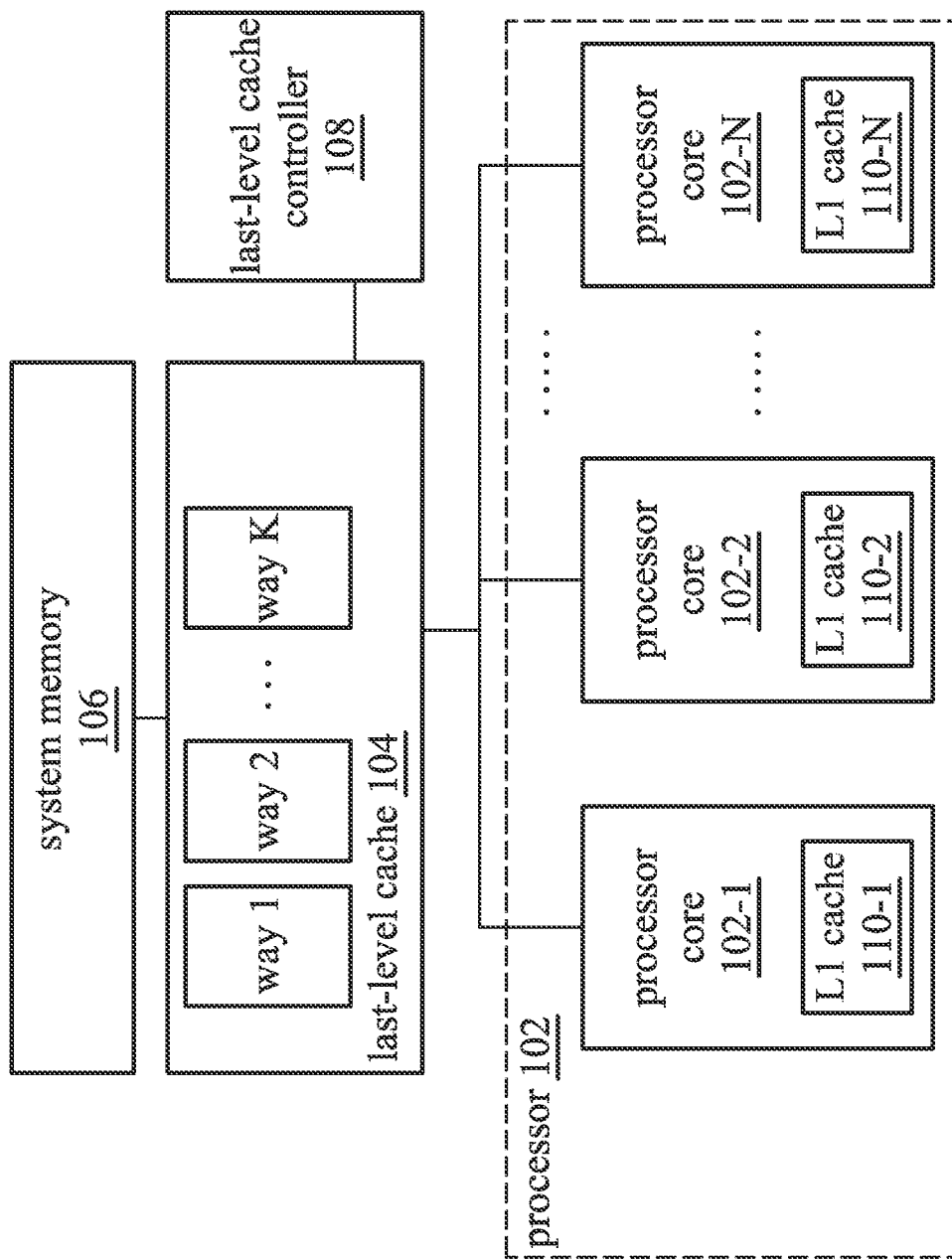
FIG. 1 presents a block diagram illustrating a computing system in accordance with some embodiments.

FIG. 1 presents a block diagram illustrating a computing system in accordance with some embodiments. As can be seen in FIG. 1, the computing system 100 includes the processor 102, the last level cache (LLC) 104, the system memory 106, and the last level cache controller 108. The processor 102 is generally a circuit that performs computational operations in a computing system 100. The processor 102 includes N processor cores, where N is a positive integer greater than 1. Each of the N processor cores 102-1 through 102-N includes a computational mechanism such as a central processing unit (CPU), a graphics processing unit (GPU), and/or an embedded processor. In one embodiment, the N processor cores 102-1 through 102-N include N1 CPU cores and N2 GPU cores, where both N1 and N2 are a positive integer. In one embodiment, the N processor cores 102-1 through 102-N are all CPU cores or all GPU cores.

The processor 102 also includes cache memories (or "caches") that can be used for storing instructions and data that are used by the N processor cores 102-1 through 102-N for performing computational operations. As shown in FIG. 1, the caches in processor 102 include a level-one (L1) cache 110-1 through 110-N in each processor core 102-1 through 102-N. Generally, L1 caches 110-1 through 110-N are the smallest of a set of caches in computing device 100 (e.g., 96 kilobytes (KB) in size) and are located closest to the circuits (e.g., execution units, instruction fetch units, etc.) in the processor cores 102-1 through 102-N that use the instructions and data stored in the L1 caches 110-1 through 110-N.

The last level cache 104 may be the largest cache in the computing system 100 (at e.g., 2 MB in size) and is shared by the processor cores 102-1 through 102-N for storing instructions and data for all of the processor cores in the processor 102. One way to do such sharing is allocating the K cache ways of the last level cache 104 among the processor cores 102-1 through 102-N. K can be any positive integer larger than 1, although some common values for K are 32 or 16. As can be seen in FIG. 1, the last level cache 104 is located external to the processor 102, accordingly, accessing data and instructions in the last level cache 104 is typically slower than other lower level caches (e.g., the L1 caches 110-1 through 110-N).

Besides the last level cache 104, the processor 102 may also include one or more higher level caches (not shown; e.g., level-2 cache or level-3 cache) that are equipped with or shared by each of the processor cores 102-1 through 102-N. Generally, the higher level caches are larger (e.g., 2048 kilobytes (KB) in size) than the lower level L1 cache 110-1 through 110-N but smaller than the last level cache 104. Accessing data and instruction to these higher level caches is typically slower than accesses to the L1 caches 110-1 through 110-N but faster than accesses to the last level cache 104 in the computing system 100.

In some embodiments, the L1 caches 110-1 through 110-N, the one or more higher level caches (not drawn in FIG. 1), and the last level cache 104 (collectively, "the caches") include memory circuits that are used for storing cached data and instructions. For example, the caches may include one or more of static random access memory (SRAM), embedded dynamic random access memory (eDRAM), DRAM, double data rate synchronous DRAM (DDR SDRAM), and/or other types of memory circuits.

The system memory 106 comprises memory circuits that form a "main memory" of the computing system 100. In some embodiments, the system memory 106 is fabricated from memory circuits such as one or more of DRAM, SRAM, DDR SDRAM, and/or other types of memory circuits. The system memory 106 and the aforementioned different levels of caches form a "memory hierarchy" in and for the computing system 100. Each of the caches and the system memory 106 are regarded as levels of the memory hierarchy, with the higher levels including the larger caches and main memory 106. Within the computing system 100, memory requests are preferentially handled in the level of the memory hierarchy that results in the fastest and/or most efficient operation of computing system 100.

The last level cache controller 108 is configured for partitioning cache ways of the last level cache 104 among the processor cores 102-1 through 102-N. In other words, the function of the last level cache controller 108 is to perform operations for partitioning the memory in the cache for use by the processor cores 102-1 through 102-N. When partitioning the memory in the last level cache 104, the last level cache controller 108 allocates/assigns portions (e.g., cache ways) of the last level cache 104 among all or some of the processor cores 102-1 through 102-N. For example, suppose N is 3 and the processor 102 comprises two CPU cores 102-1 and 102-2, and one GPU core 102-3. The last level cache controller 108 may partition the last level cache 104 in such a way that the processor core 102-1 has access to K1 cache ways, the processor core 102-2 has access to K2 cache ways and the processor core 102-3 has access to K3 cache ways, where K1+K2+K3 is equal to or smaller than K, the number of overall cache ways of the last level cache 104.

Figure 2:
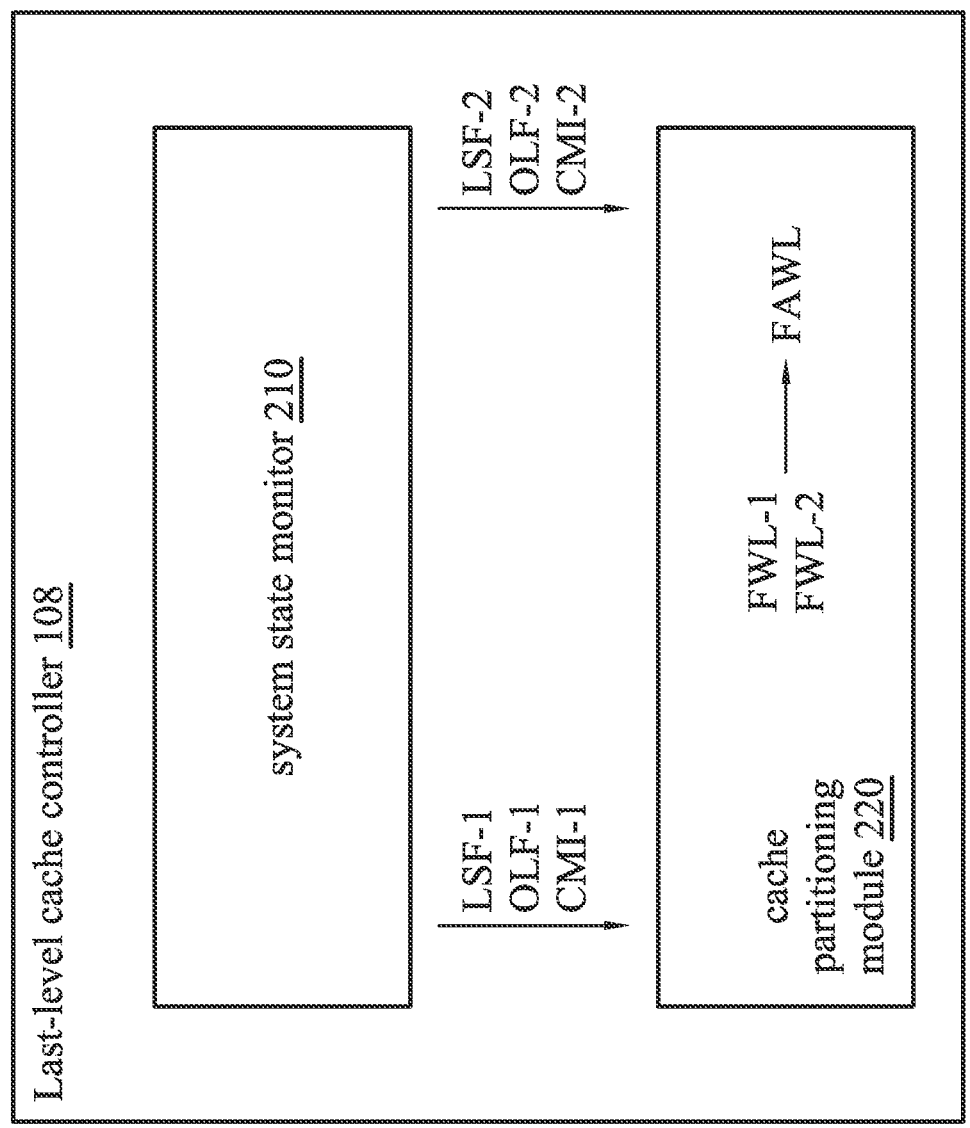
FIG. 2 illustrates a block diagram of a last level cache controller according to one embodiment of the invention.

FIG. 2 illustrates a block diagram of the last level cache controller 108 according to one embodiment of the invention. The last level cache controller 108 comprises the system state monitor 210 and the cache partitioning module 220. For ease of illustrating how the last level cache controller 108 partitions the last level cache 104 among the processor cores 102-1 through 102-N, unless otherwise stated, below the last level cache 104 is assumed to have 4 cache ways, and N is assumed to be 2 with the processor 102 having two processor cores 102-1 (a CPU core) and 102-2 (a GPU core).

Figure 3:
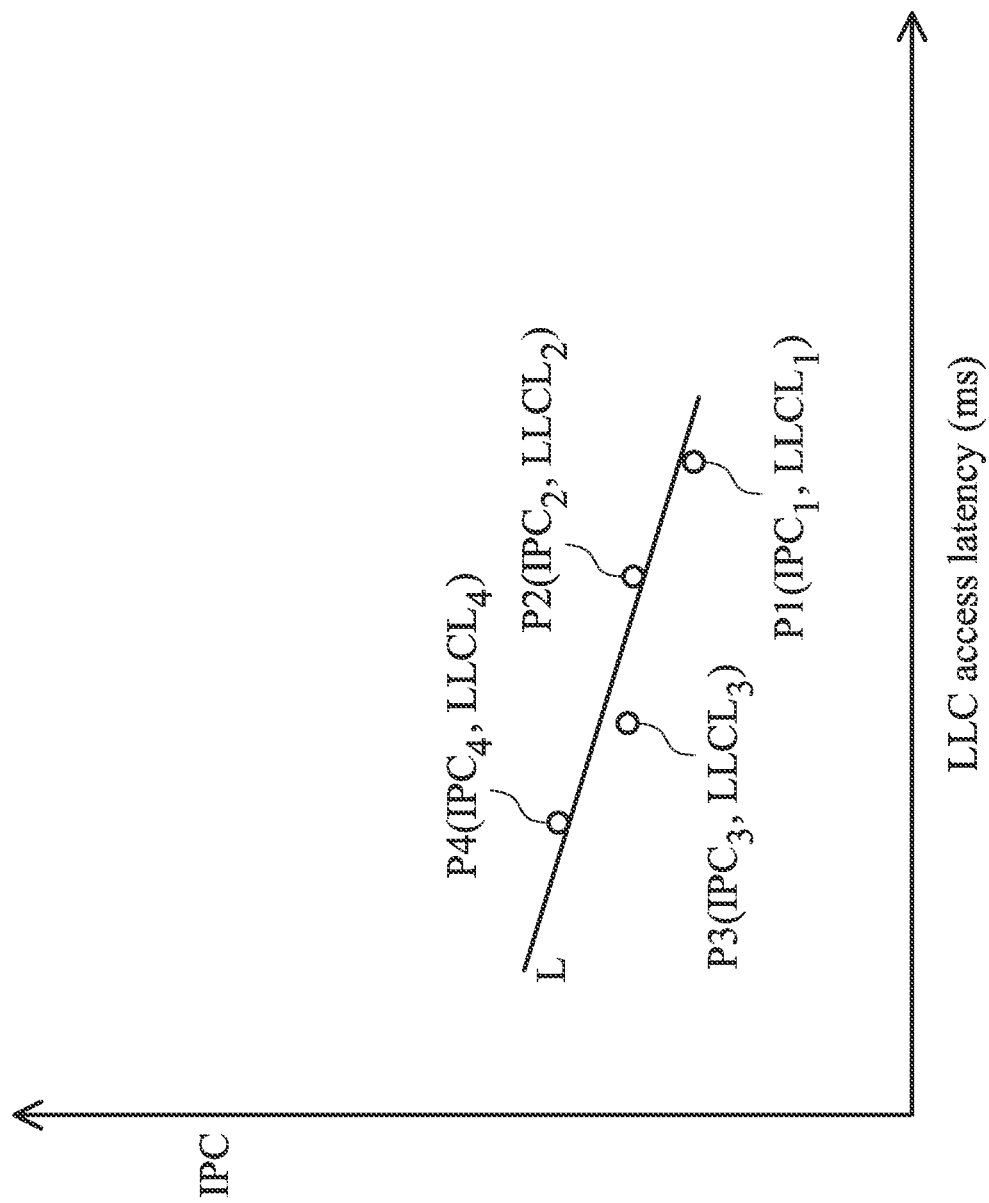
FIG. 3 shows how a latency sensitivity factor is obtained according to still another embodiment of the invention.

For the CPU core 102-1, the system state monitor 210 is configured to obtain the latency sensitivity factor LSF-1, the off-chip latency factors OLF-1, and the cache miss information CMI-1. In one embodiment, the latency sensitivity factor LSF-1 correlates instruction committed/executed and last level cache (LLC) access latency associated with the processor core 102-1. The latency sensitivity factor LSF-1 can be obtained by measuring a plurality of executed instructions per cycle (IPC) and a plurality of LLC access latencies, and correlating the plurality of IPC and the plurality of LLC access latencies using a linear regression model. FIG. 3 gives an example for illustrating how the system state monitor 210 obtains the latency sensitivity factor LSF-1. P1(IPC1, LLCL1) denotes IPC and LLC access latency measured during a first time interval, P2(IPC2, LLCL2) denotes IPC and LLC access latency measured during a second time interval, P3(IPC3, LLCL3) denotes IPC and LLC access latency measured during a third time interval, and P4(IPC4, LLCL4) denotes IPC and LLC access latency measured during a fourth time interval. It can be seen that as LLC access latency increases, IPC decreases. This is because as LLC access latency increases, it takes the processor core 102-1 more time to complete executing one instruction. By approaching P1 through P4 with a linear regression model (represented by the line L), the latency sensitivity factor LSF-1 (the slope of the line L) can be obtained. In practice, the IPC can be measured by using a first counter to record the committed/executed instruction by the processor core 102-1 while the LLC access latency can be measured by using a second counter to record the content of a Miss Status Holding Register (MSHR) of a next-lower level cache (i.e., L2 cache if the last level cache 104 is a L3 cache) so as to know the time it takes for the next-lower level cache to retrieve data/instructions from the last level cache 104.

In one embodiment, the off-chip latency factors OLF-1 correlate the off-chip memory latency and the off-chip memory access count associated with the processor core 102-1. The off-chip memory latency refers to the time it takes to access data/instruction from the system memory 106, where such access happens when the data/instructions cannot be found in any of the caches mentioned above. The off-chip memory access count refers to the number of data/instruction access requests fired to the system memory 106. The off-chip latency factors OLF-1 can be obtained by measuring a plurality of off-chip memory latencies and a plurality of off-chip memory access counts, and correlating the plurality of off-chip memory latencies and the plurality of off-chip memory access counts using another linear regression model as analogously described regarding the latency sensitivity factor LSF-1. The other linear regression model may be expressed by the formula F1: off-chip memory latency=A*(off-chip memory access count)+B, where A and B represent coefficients that constitute the off-chip latency factors OLF-1. In practice, the off-chip memory access count may be obtained by adding a counter at a system memory controller (not shown in FIG. 1, typically known as a DRAM controller if the system memory 106 is a DRAM) to count the number of system memory access requests received by the system memory controller during a period of time. On the other hand, the off-chip memory latency may be obtained by adding another counter to record content of the MSHR of the last level cache 104 so as to know the time it takes for the last level cache 104 to retrieve data/instruction from the system memory 106.

The cache miss information CMI-1 comprises a plurality of entries, where each entry shows a cache miss count given an allocated number of cache ways for the processor core 102-1. FIG. 4A illustrates what the cache miss information CMI-1 may look like according to one embodiment. FIG. 4A shows that there will be 20 cache misses when the processor core 102-1 is allocated with 0 cache way of the last level cache 104, 10 cache misses when the processor core 102-1 is allocated with 1 cache way of the last level cache 104, and so forth. As the processor core 102-1 is allocated with more and more caches ways of the last level cache 104, it can be expected that the cache miss count with respect to the processor core 102-1 decreases. To obtain the cache miss information CMI-1, one practical approach is to adopt the idea disclosed in Qureshi et al. (Utility-Based Cache Partitioning: A Low-Overhead, High-Performance, Runtime Mechanism to Partition Shared Caches, In Proceedings of the 39th Annual IEEE/ACM International Symposium on Microarchitecture (MICRO 39), 2006), where shadow tag arrays are applied on the monitored cache ways to record a corresponding cache hit/miss number during a certain monitor interval. For the sake of brevity, the detailed implementation for obtaining the cache miss information CMI-1 is omitted here.

Please turn your attention back to FIG. 2. Besides the latency sensitivity factor LSF-1, the off-chip latency factors OLF-1, and the cache miss information CMI-1, the system state monitor 210 is also configured to obtain the latency sensitivity factor LSF-2, the off-chip latency factors OLF-2, and the cache miss information CMI-2 for the GPU core 102-2 in similar manners as disclosed above for the CPU core 102-1. To elaborate more, the CMI-2 may also be any suitable data structure that records the cache miss count versus the number of allocated cache ways of the GPU core 102-2. FIG. 4B gives an exemplary CMI-2 data format. It can be seen from FIG. 4B that, for instance, 15 cache misses occur when the GPU core 102-2 is assigned with 2 cache ways of the last level cache 104 while only 8 cache misses occur when the GPU core 102-2 is assigned with 4 cache ways of the last level cache 104.

Based on the information provided by the system state monitor 210, the cache partitioning module 220 decides how to partition the last level cache 104 among the processor cores 102-1 and 102-2. That is, the cache partitioning module 220 determines how many cache ways of the last level cache 104 would be assigned for use by the CPU core 102-1 and how many cache ways of the last level cache 104 would be assigned for use by the GPU core 102-2. One way to do this is to select a first cache partition configuration and evaluate whether such a configuration is an appropriate way of allocating the last level cache among the processor cores 102-1 and 102-2. For a detailed understanding of the cache partitioning module 220, let's consider that the CPU core 102-1 and the GPU core 102-2 are respectively assigned with 3 cache ways and 1 cache way of the last level cache 104 as the first cache partition configuration. Unless otherwise stated below, the first cache partition configuration is assumed to allocate 3 cache ways to the CPU core 102-1 and 1 cache way to the GPU core 102-2. Note that this is only for illustrative purposes and should by no means limit the scope of the invention.

For the CPU core 102-1, the cache partitioning module 220 calculates a first weighted latency FWL-1 according to the latency sensitivity factor LSF-1, the off-chip latency factors OLF-1, and the cache miss information CMI-1 that corresponds to the first cache partition configuration. In one embodiment, this can be expressed as the formula F2: FWL-1=LSF-1\*Fx(OLF-1, CMI-1), where Fx(OLF-1, CMI-1) denotes a function of the off-chip latency factors OLF-1, and the cache miss information CMI-1. More specifically, the Fx(OLF-1, CMI-1) can be derived as the steps immediately shown below according to one embodiment of the invention. In a first step, an off-chip memory latency is calculated that corresponds to a case where the CPU core 102-1 is allocated with three cache ways of the last level cache 104. The off-chip memory latency can be obtained by substituting 6 (the number of cache miss counts of the CPU core 102-1 when assigned three cache ways) into the off-chip memory access count in the formula F1 and replacing the A and B of the formula F1 with the off-chip latency factors OLF-1. In a second step, calculate an LLC latency using the formula F3: LLC latency=hit-ratio\*hit-time+miss-ratio\*off-chip memory latency. In the formula F3, the off-chip memory latency is obtained in the first step. The hit-ratio and the miss-ratio can be derived based on the cache miss information CMI-1 as shown in FIG. 4A, where the cache miss count that corresponds to 0 cache ways (i.e., 20) is the total cache access times (because when assigned with 0 cache ways, every cache access event results in one cache miss count) and the miss-ratio would be 6/20 with 6 being the cache miss count when the CPU core 102-1 is assigned with three cache ways of the last level cache 104; likewise, the hit ratio would be 14/20. Note that the hit-time may be previously known or even in some cases the hit-time may be so small compared with the off-chip memory latency that it can be neglected. By substituting the LLC latency derived in the formula F3 into the Fx(OLF-1, CMI-1) in the formula F2 to multiply with the latency sensitivity factor LSF-1, the first weighted latency FWL-1 of the CPU core 102-1 when assigned with three cache ways can be obtained.

Thus, the first weighted latency FWL-1 can be said to be obtained according to the latency sensitivity factor LSF-1, the off-chip latency factors OLF-1, and a first entry (i.e., the row of three cache ways allocated to the CPU core 102-1 in FIG. 4A) of the cache miss information CMI-1 that corresponds to the first cache partition configuration.

By repeating the above arithmetic flow regarding the first weighted latency FWL-1 for the GPU core 102-2, a first weighted latency FWL-2 of the GPU core can be obtained as well. In particular, the first weighted latency FWL-2 is calculated according to the latency sensitivity factor LSF-2, the off-chip latency factors OLF-2 and the cache miss information CMI-2 as shown in FIG. 4B. Note that under the first cache partition configuration, the GPU core 102-2 is assigned with 1 cache way; hence, it is the row of 1 cache way in FIG. 4B that would be referenced to calculate the first weighted latency FWL-2. Specifically, the first weighted latency FWL-2 is obtained according to the latency sensitivity factor LSF-2, the off-chip latency factors OLF-2, and a first entry (i.e., the row of 1 cache way allocated to the CPU core 102-1 in FIG. 4B) of the cache miss information CMI-2 that corresponds to the first cache partition configuration.

Once the first weighted latency FWL-1 and FWL-2 are derived, the cache partitioning module 220 may further obtain a first aggregated weighted latency FAWL according to the first weighted latency FWL-1 and FWL-2. In one embodiment, the first aggregated weighted latency FAWL is calculated based on the formula F4: FAWL=FWL-1+FWL-2. Next, the cache partitioning module 220 determines whether a partition criterion is satisfied by taking the first aggregated weighted latency FAWL into consideration.

Figure 5:
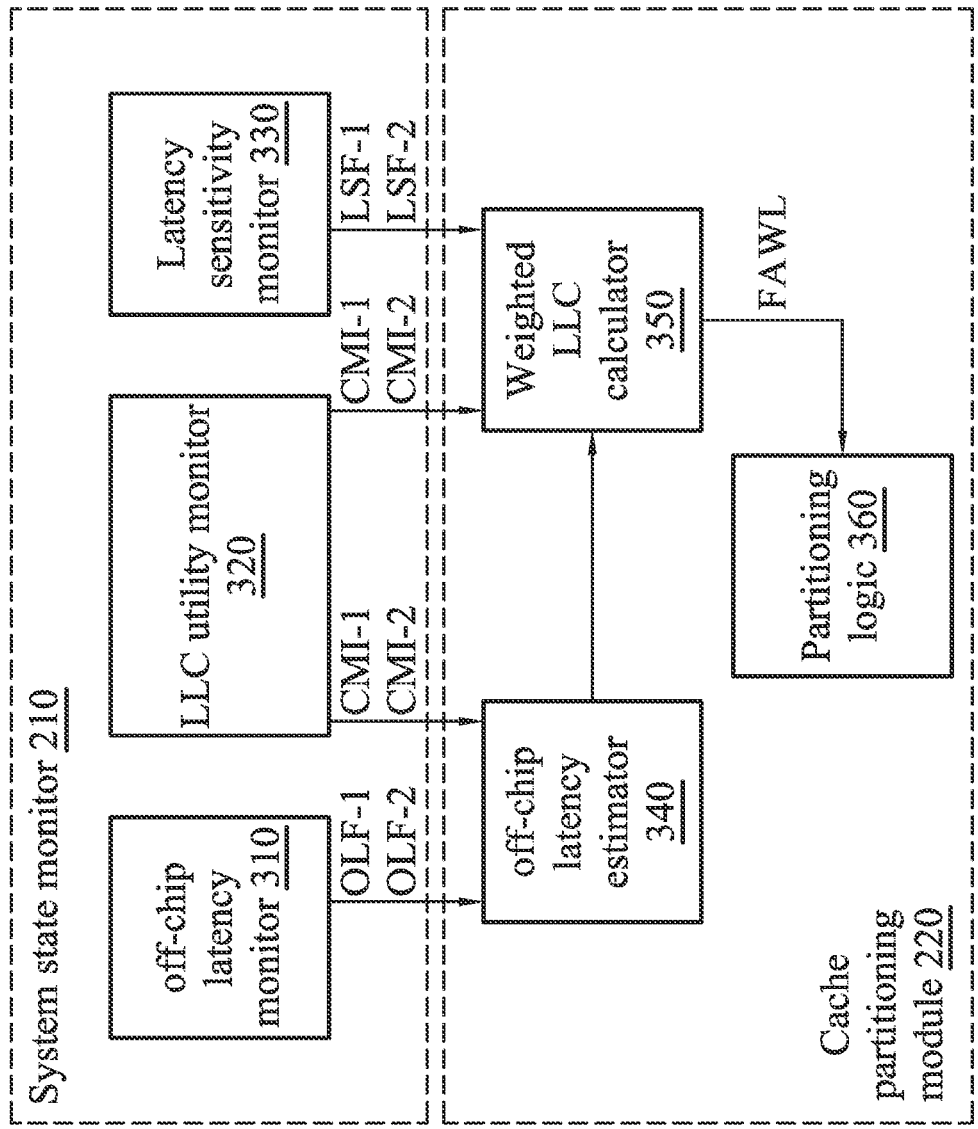
FIG. 5 is a schematic of a system state monitor and a cache partitioning module of a last level cache controller according to another embodiment of the invention.

FIG. 5 is a schematic of the system state monitor and the cache partitioning module according to another embodiment of the invention. The system state monitor 210 comprises the off-chip latency monitor 310, the LLC utility monitor 320 and the latency sensitivity monitor 330. The cache partitioning module 220 comprises the off-chip latency estimator 340, the weighted LLC calculator 350 and the partitioning logic 360. Please refer to FIG. 5 in light of FIG. 2.

The latency sensitivity monitor 330 is configured to obtain the latency sensitivity factor LSF-1 and LSF-2. The LLC utility monitor 320 is configured to obtain the cache miss information CMI-1 and CMI-2. The off-chip latency monitor 310 is configured to obtain the off-chip latency factors OLF-1 and OLF-2. The detailed operations of the three circuit are disclosed previously and is omitted here for sake of brevity.

The off-chip latency estimator 340 receives the off-chip latency factor OLF-1 and OLF-2, and the cache miss information CMI-1 and CMI-2 for predicting the off-chip memory latency based on the formula F1. The weighted LLC latency calculator 350 receives that cache miss information CMI-1 and CMI-2 and the latency sensitivity factor LSF-1 and LSF-2, and then effectively implements the formula F3, the formula F2 and the formula F4 in turn to derive the first aggregated weighted latency FAWL. Similarly, the detailed operations regarding the off-chip latency estimator 340 and the weighted LLC latency calculator 350 are omitted here as they have been described previously. The partitioning logic 360 determines whether the partition criterion is satisfied, wherein the partition criterion takes the first aggregated weighted latency into consideration; and the partitioning logic 360 partitions the cache ways of the last level cache 104 using the first partition configuration when determining that the partition criterion is satisfied.

According to one embodiment of the invention, the system state monitor 210 measures each of the plurality of IPC and each of the plurality of LLC access latencies during a first period and the cache partitioning module 220 determines whether the partition criterion is satisfied once during a second period, wherein the second period is longer than the first period. In one embodiment, the second period is five million processor clock cycles while the first period is 0.5 million processor clock cycles.

In one embodiment, the partition criterion is that the first aggregated weighted latency FAWL is smaller than a predefined value. When the partition criterion is satisfied, this implies that the first partition configuration has at least a certain degree of efficiency from a latency perspective in that the first aggregated weighted latency FAWL is smaller than the predefined value. And then, the cache partitioning module 220 would partition the cache ways of the last level cache using the first partition configuration when determining that the partition criterion is satisfied. Simply put, the cache partitioning module 220 would allocate 3 cache ways to the CPU core 102-1 and 1 cache way to the GPU core 102-2.

In another embodiment, the partition criterion is that the first aggregated weighted latency FAWL is smaller than a current aggregated weighted latency CAWL. The scenario is that while the cache partitioning module 220 is evaluating whether the first cache partition configuration (i.e., allocating three cache ways to the CPU core 102-1 and allocate 1 cache way to the GPU core 102-2) is an efficient partition for the last level cache 104, the last level cache 104 may be currently allocated under a current cache partition configuration. The current aggregated weighted latency CAWL can be obtained in analogous steps as mentioned above regarding the first aggregated weighted latency FAWL. Unless otherwise stated below, the current cache partition configuration is assumed to allocate two cache ways to the CPU core 102-1 and two cache ways to the GPU core 102-2. Note that this is only for illustrative purposes and should by no means limit the scope of the invention.

A current weighted latency CWL-1 for the CPU core 102-1 is obtained according to the latency sensitivity factor LSF-1, the plurality of off-chip memory latencies measured by the system state monitor 210 and a current entry (i.e., the row of 2 cache way allocated to the CPU core 102-1 in FIG. 4A) of the cache miss information CMI-1 that corresponds to the current cache partition configuration. Here, the formula F1 may not be needed for estimating off-chip memory latency under the current cache partition configuration because the plurality of off-chip memory latencies measured by the system state monitor 210 are actually the off-chip memory latency that corresponds to the current cache partition configuration. Put differently, the system state monitor 210 simply monitors under the current cache partition configuration. In the same manner, a current weighted latency CWL-2 for the GPU core 102-2 can be derived.

Afterwards, the cache partitioning module 220 may derive the current aggregated weighted latency CAWL according to the current weighted latency CWL-1 and CWL-2. The cache partitioning module 220 may directly add the current weighted latency CWL-1 and CWL-2 to get the current aggregated weighted latency CAWL. The cache partitioning module 220 then compares the current aggregated weighted latency CAWL with the first aggregated weighted latency FAWL, and allocates the last level cache 104 using the first cache partition configuration if the partition criterion is satisfied (the first aggregated weighted latency FAWL is smaller than the current aggregated weighted latency CAWL). One major advantage is that the cache partitioning module 220 can decide whether the first cache partition configuration is more favorable than the current cache partition configuration without really allocating the last level cache 104 using the first cache partition configuration. If it is determined that the first aggregated weighted latency FAWL is not smaller than the current aggregated weighted latency CAWL, the last level cache 104 may remain partitioned using the current cache partition configuration.

In still another embodiment of the invention, the partition criterion is that the first aggregated weighted latency FAWL is the smallest among all feasible last level cache partition configurations among the processor 102. For the processor core 102-1 and 102-2 with the last level cache 104 having four cache ways, there are 5 feasible configurations with the processor core 102-1 taking all four cache ways on one extreme case and the processor core 102-2 taking all four cache ways on the other extreme case. That is, the cache partitioning module 220 further calculates three aggregated weighted latency that each corresponds to the other three feasible cache partition configurations (the processor core 102-1 takes four cache ways, the processor core 102-2 takes four cache ways, and the processor core 102-1 takes one cache ways and the processor core 102-2 takes three cache ways). Once the first aggregated weighted latency FAWL is found to be the smallest among the five aggregated weighted latency, the cache partitioning module 220 determines that the partition criterion is satisfied and partitions the cache ways of the last level cache 104 using the first partition configuration.

As mentioned earlier, in general, the processor 102 has N processor cores 102-1 through 102-N and the last level cache 104 has K cache ways. Then, according to one embodiment, the system state monitor 210 is configured to obtain, for each of the processor cores 102-1 through 102-N, a latency sensitivity factor, off-chip latency factors and cache miss information, wherein the cache miss information comprises a plurality of entries and each entry shows a cache miss count under an allocated number of cache ways. The cache partitioning module 220 is configured to do the following: obtain, for each of the processor cores 102-1 through 102-N, a first weighted latency according to the latency sensitivity factor, the off-chip latency factors, and a first entry of the cache miss information that corresponds to a first cache partition configuration; obtain a first aggregated weighted latency according to the first weighted latency of each of the processor cores 102-1 through 102-N; determine whether a partition criterion is satisfied, wherein the partition criterion takes the first aggregated weighted latency into consideration; and partition the K cache ways of the last level cache 104 using the first partition configuration when determining that the partition criterion is satisfied.

According to another embodiment, the partition criterion is that the first aggregated weighted latency is the smallest among a second aggregated weighted latency through a Mth aggregated weighted latency, wherein M is the number of all feasible last level cache partition configurations among the processor cores 102-1 through 102-N, and the cache partitioning module 220 is further configured to obtain the second aggregated weighted latency through the Mth aggregated weighted latency by: obtaining, for each of the processor cores 102-1 to 102-N, a second weighted latency according to the latency sensitivity factor, the off-chip latency factors, and a second entry of the cache miss information corresponds to a second cache partition configuration through a Mth weighted latency according to the latency sensitivity factor, the off-chip latency factors, and a Mth entry of the cache miss information corresponds to a second cache partition configuration; and obtaining the second aggregated weighted latency according to the second weighted latency of each of the processor cores 102-1 to 102-N through the Mth aggregated weighted latency according to the Mth weighted latency of each of the processor cores 102-1 to 102-N. It should be understood that some of the first entry, second entry through the Mth entry of the cache miss information of any particular processor core may in fact correspond to a same physical content since the number of feasible cache partition configuration may far exceed the number of entry of the cache miss information of a processor core.

As noted above, the N processor cores 102-1 through 102-N may contain one or more first cores (e.g., CPU cores) and one or more second cores (e.g., GPU cores). According to still another embodiment, a current cache partition configuration allocates the K cache ways of the last level cache 104 to the one or more first cores and the first cache partition configuration allocates the K cache ways of the last level cache 104 to the one or more first cores and one second core, wherein the one second core is selected according to the cache miss information of each of the one or more second cores. To be a promising candidate that would yield lower aggregated weighted latency, the first cache partition would select the second core that may reduce the highest number of cache miss count among the one or more second cores. Suppose there are two second cores SC-1 and SC-2. For both SC-1 and SC-2, when assigned with no cache ways of the last level cache 104, there will be 30 last level cache miss counts for each during a period of time. And, for SC-1, the cache miss counts become 20 when assigned with 1 cache way whereas for SC-2 the cache miss counts become 25 when assigned with 1 cache way. Then, the cache partition module 220 would choose SC-1 instead of SC-2 when arranging the first cache partition configuration. In other words, the first cache partition configuration may allocate K−1 cache ways among the one or more first cores and 1 cache way to the second core SC-1 to calculate the first aggregated weighted latency to determine whether the first cache partition configuration should be adopted.

Figure 6:
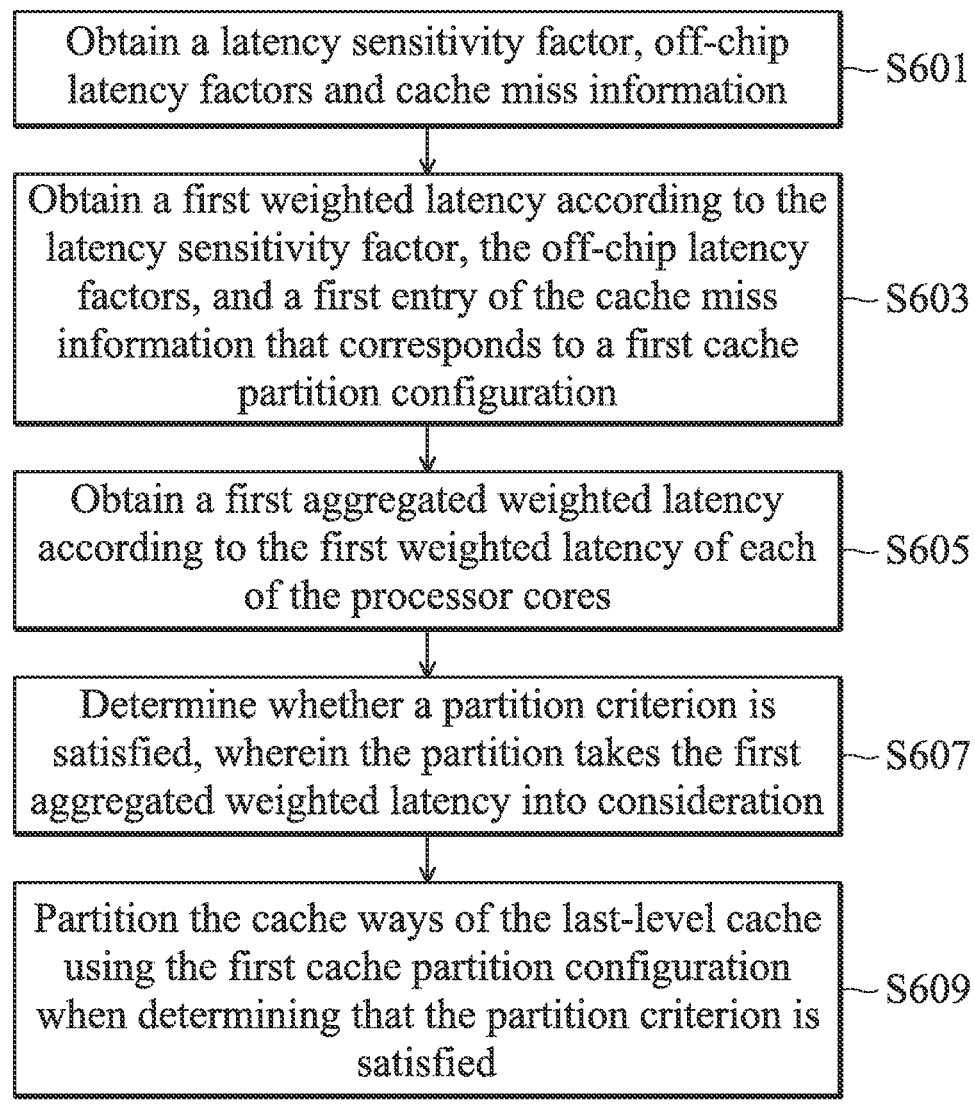
FIG. 6 is a flow chart illustrating a method for last level cache management according to an embodiment of the invention.

FIG. 6 is a flow chart illustrating a method for last level cache management according to an embodiment of the invention. The method is for partitioning cache ways of a last level cache among processor cores. Steps S601 and S603 are performed with respect to each of the processor cores. In step S601, a latency sensitivity factor, off-chip latency factors and cache miss information are obtained. In steps S603, a first weighted latency is obtained according to the latency sensitivity factor, the off-chip latency factors, and a first entry of the cache miss information that corresponds to a first cache partition configuration. In step S605, a first aggregated weighted latency is obtained according to the first weighted latency of each of the processor cores. In step S607, it is determined whether a partition criterion is satisfied, wherein the partition criterion takes the first aggregated weighted latency into consideration. In step S609, the cache ways of the last level cache is partitioned using the first cache partition configuration when determining that the partition criterion is satisfied.

The method in FIG. 6 may be performed by hardware (e.g., circuitry, dedicated logic, programmable logic, microcode, application specific integrated circuits (ASICs), field-programmable gate arrays (FPGAs), etc.), software (e.g., instructions run on a processing device), or a combination thereof. In one embodiment, the method is performed by the last level cache controller 108 in the computing system 100 of FIGS. 1, 2 and 4. In one embodiment, the computing system 100 may be part of a mobile computing and/or communication device (e.g., a smartphone, a tablet, a laptop, etc.). In one embodiment, the computing system 100 may be part of a cloud computing system. In one embodiment, the computing system 100 may be a heterogeneous computing system including miscellaneous types of processors such as CPUs, GPUs and/or DSPs.

The operations of the flow diagram of FIG. 6 have been described with reference to the exemplary embodiments of FIGS. 1, 2 and 5. However, it should be understood that the operations of the flow diagrams of FIG. 6 can be performed by embodiments of the invention other than those discussed with reference to FIGS. 1, 2 and 5, and the embodiments discussed with reference to FIGS. 1, 2 and 5 can perform operations that are different from those discussed with reference to the flow diagrams. While the flow diagrams of FIG. 6 show a particular order of operations performed by certain embodiments of the invention, it should be understood that such order is exemplary (e.g., alternative embodiments may perform the operations in a different order, combine certain operations, overlap certain operations, etc.).

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A last level cache controller for partitioning cache ways of a last level cache (LLC) among processor cores, the last level cache controller comprising:
   a system state monitor configured to obtain, for each of the processor cores, a latency sensitivity factor, off-chip latency factors and cache miss information, wherein the latency sensitivity is a linear regression correlation of a number of executed instructions per cycle and a number of last level cache access latencies, wherein the off-chip latency factors is a correlation of off-chip memory latency and an off-chip memory access count associated with a particularly one of the processor cores, wherein the cache miss information comprises a plurality of entries and each entry shows a cache miss count under an allocated number of cache ways; and
   a cache partitioning module configured to:
      obtain, for each of the processor cores, a first weighted latency according to the latency sensitivity factor, the off-chip latency factors, and a first entry of the cache miss information that corresponds to a first cache partition configuration;
      obtain a first aggregated weighted latency according to the first weighted latency of each of the processor cores;
      determine whether a partition criterion is satisfied, wherein the partition criterion takes the first aggregated weighted latency into consideration; and
      partition the cache ways of the last level cache using the first cache partition configuration when determining that the partition criterion is satisfied.

2. The last level cache controller of claim 1, wherein the partition criterion is that the first aggregated weighted latency is smaller than a predefined value.

3. The last level cache controller of claim 1, wherein the system state monitor obtains the latency sensitivity factor by doing the following for each of the processor cores:
   measuring a plurality of executed instructions per cycle (IPC) and a plurality of last level cache access latencies; and
   correlating the plurality of executed instructions per cycle (IPC) and the plurality of last level cache access latencies to obtain the latency sensitivity factor using a linear regression model.

4. The last level cache controller of claim 1, wherein the system state monitor obtains the off-chip latency factors by doing the following for each of the processor cores:
   measuring a plurality of off-chip latencies and a plurality of off-chip memory access counts; and
   correlating the plurality of off-chip latencies and the plurality of off-chip memory access counts to obtain the off-chip latency factors using a linear regression model.

5. The last level cache controller of claim 4, wherein the partition criterion is that the first aggregated weighted latency is smaller than a current aggregated weighted latency, and the cache partitioning module is further configured to obtain the current aggregated weighted latency by:
   obtaining, for each of the processor cores, a current weighted latency according to the latency sensitivity factor, the plurality of off-chip latencies and an entry of the cache miss information that corresponds to a current cache partition configuration; and
   obtaining the current aggregated weighted latency according to the current weighted latency of each of the processor cores.

6. The last level cache controller of claim 5, wherein the current cache partition configuration allocates the cache ways of the last level cache to the one or more first cores, and the first cache partition configuration allocates all the cache ways of the last level cache to the one or more first cores and a second core, wherein the second core is selected according to the cache miss information of each of the second cores.

7. The last level cache controller of claim 3, wherein the system state monitor measures each of the plurality of executed instructions per cycle (IPC) and each of the plurality of last level cache access latencies during a first period and the cache partitioning module determines whether the partition criterion is satisfied once during a second period, wherein the second period is longer than the first period.

8. The last level cache controller of claim 1, wherein the partition criterion is that the first aggregated weighted latency is the smallest among a second aggregated weighted latency through a Mth aggregated weighted latency, wherein M is a number of all feasible last level cache partition configurations among the processor cores, and the cache partitioning module is further configured to obtain the second aggregated weighted latency through the Mth aggregated weighted latency by:
   obtaining, for each of the processor cores, a second weighted latency according to the latency sensitivity factor, the off-chip latency factors and a second entry of the cache miss information that corresponds to a second cache partition configuration through a Mth weighted latency according to the latency sensitivity factor, the off-chip latency factors and a Mth entry of the cache miss information that corresponds to a Mth cache partition configuration; and obtaining the second aggregated weighted latency according to the second weighted latency of each of the processor cores through the Mth aggregated weighted latency according to the Mth weighted latency of each of the processor cores.

9. The last level cache controller of claim 1, wherein each of the one or more first cores is a core of a graphics processing unit (GPU), and each of the one or more second cores is a core of a central processing unit (CPU).

10. The last level cache controller of claim 1, wherein each of the one or more first cores is a big core of one of a GPU and a CPU, and each of the one or more second cores is a little core of the one of the GPU and the CPU.

11. A last level cache partition method for partitioning cache ways of a last level cache (LLC) among processor cores, the last level cache partition method comprising:
  for each of the processor cores:
    obtaining a latency sensitivity factor, off-chip latency factors and cache miss information, wherein the latency sensitivity is a linear regression correlation of a number of executed instructions per cycle and a number of last level cache access latencies, wherein the off-chip latency factors is a correlation of off-chip memory latency and an off-chip memory access count associated with a particularly one of the processor cores, wherein the cache miss information comprises a plurality of entries and each entry shows a cache miss count under an allocated number of cache ways; and
    obtaining a first weighted latency according to the latency sensitivity factor, the off-chip latency factors, and a first entry of the cache miss information that corresponds to a first cache partition configuration;
  obtaining a first aggregated weighted latency according to the first weighted latency of each of the processor cores;
  determining whether a partition criterion is satisfied, wherein the partition criterion takes the first aggregated weighted latency into consideration; and
  partitioning the cache ways of the last level cache using the first partition configuration when determining that the partition criterion is satisfied.

12. The last level cache partition method of claim 11, wherein the partition criterion is that the first aggregated weighted latency is smaller than a predefined value.

13. The last level cache partition method of claim 11, wherein the latency sensitivity factor is obtained by doing the following for each of the processor cores:
  measuring a plurality of executed instructions per cycle (IPC) and a plurality of last level cache access latencies; and
  correlating the plurality of executed instructions per cycle (IPC) and the plurality of last level cache access latencies to obtain the latency sensitivity factor using a linear regression model.

14. The last level cache partition method of claim 11, wherein the latency sensitivity factor is obtained by doing the following for each of the processor cores:
  measuring a plurality of off-chip latencies and a plurality of off-chip memory access counts; and
  correlating the plurality of off-chip latencies and the plurality of off-chip memory access counts to obtain the off-chip latency factors using a linear regression model.

15. The last level cache partition method of claim 14, wherein the partition criterion is that the first aggregated weighted latency is smaller than a current aggregated weighted latency, the method further comprising:
  for each of the processor cores:
    obtaining a current weighted latency according to the latency sensitivity factor, the plurality of off-chip latencies and an entry of the cache miss information that corresponds to a current cache partition configuration; and
    obtaining the current aggregated weighted latency according to the current weighted latency of each of the processor cores.

16. The last level cache partition method of claim 15, wherein the current cache partition configuration allocates all the cache ways of the last level cache to the one or more first cores, and the first cache partition configuration allocates all the cache ways of the last level cache to the one or more first cores and a second core, wherein the second core is selected according to the cache miss information of each of the second cores.

17. The last level cache partition method of claim 13, wherein each of the plurality of executed instructions per cycle (IPC) and each of the plurality of last level cache access latencies are measured during a first period and determining whether the partition criterion is satisfied is performed once during a second period, wherein the second period is longer than the first period.

18. The last level cache partition method of claim 11, wherein the partition criterion is that the first aggregated weighted latency is the smallest among a second aggregated weighted latency through a Mth aggregated weighted latency, wherein M is a number of all feasible last level cache partition configurations among the processor cores, the method further comprising:
  for each of the processor cores:
    obtaining a second weighted latency according to the latency sensitivity factor, the off-chip latency factors and a second entry of the cache miss information that corresponds to a second cache partition configuration through a Mth weighted latency according to the latency sensitivity factor, the off-chip latency factors and a Mth entry of the cache miss information that corresponds to a Mth cache partition configuration; and
    obtaining the second aggregated weighted latency according to the second weighted latency of each of the processor cores through the Mth aggregated weighted latency according to the Mth weighted latency of each of the processor cores.

19. The GPU of claim 11, wherein each of the one or more first cores is a core of a graphics processing unit (GPU), and each of the one or more second cores is a core of a central processing unit (CPU).

20. The GPU of claim 11, wherein each of the one or more first cores is a big core of one of a GPU and a CPU, and each of the one or more second cores is a little core of the one of the GPU and the CPU.

* * * * *